United States Patent Office 3,383,334
Patented May 14, 1968

3,383,334
PROCESS FOR INORGANIC POLYMERS
Peter Francis Radice, King of Prussia, and Anthony Joseph Saraceno, Devon, Pa., assignors to Pennsalt Chemical Corporation, Philadelphia, Pa., a corporation of Pennsylvania
No Drawing. Filed Aug. 13, 1965, Ser. No. 479,608
8 Claims. (Cl. 260—2)

This invention relates to the method of making improved coordination polymers and more particularly is concerned with a method for making polymers and copolymers involving a doubly bridged (catenated) trivalent octahedral metal coordinated with two unidentate ligands, whereby the polymer backbone and the coordinated groups are entirely inorganic.

Polymers and copolymers are described in the application of Anthony J. Saraceno, U.S. Ser. No. 382,924, filed July 15, 1964 now U.S. Patent No. 3,275,574, granted Sept. 27, 1966, which have unexpectedly high temperature stability and are useful for fabricated articles and as coating compositions to be employed under high temperature conditions. Those polymers and copolymers have the repeating units $M(a)(b)X_2$ wherein M is a trivalent octahedral metal, $a$ is a unidentate ligand having a charge of minus one (that is, it is a negative monovalent ion), $b$ is a neutral unidentate ligand, and X is a bridging group also with a charge of minus one. Alternatively, the solid polymers may be represented as compounds containing a plurality of the following recurring units:

wherein M, $a$, $b$ and X are defined above and the repeating units may be the same (homopolymers) or different (copolymers). The polymers and copolymers previously prepared have had high molecular weights, as expressed by intrinsic viscsoity values on the order of from about 0.1 to about 0.6. Now it has been found that these polymers may be prepared to have significantly higher intrinsic viscosity values and this enables films of these inorganic polymers and copolymers to be obtained with improved homogeneity and optical clarity.

In accord with the invention improved inorganic polymers are prepared by the method which comprises treating a non-aqueous solution of a polymer of structure

where M, $a$, $b$, and X are defined above with a tertiary amine to form a complex of the polymer and amine, dissolving the complex in a solvent selected from the group consisting of liquid chlorinated aromatic hydrocarbons and liquid chlorinated aliphatic hydrocarbons, and allowing said solution to stand until further polymerization is completed.

As set forth in Ser. No. 382,924 (U.S. Patent No. 3,275,574), the trivalent octahedral metal M may be any of the numerous metals characterized by having a relatively unstable +2 valence which can be oxidized to the stable trivalent oxidation rate and has in its trivalent state a coordination number of six (i.e. an octahedral spatial configuration). By a relatively unstable +2 valence state is meant that the metal in its divalent state as its simple salts is capable of being oxidized to its trivalent state by air at ambient temperature and at atmospheric pressure. Such metals will include those metals selected from the group consisting of chromium, iron, ruthenium, europium and ytterbium.

The catenating or bridging group (X in the above formula of the polymers) will have a charge of minus one and will comprise the anion of an acid. Preferably, the acid will be one having the structure $R_2M'(O)OH$ which is based on a group of metals and metalloids of group VB; that is, M' is an element of group VB having an atomic number greater than seven (e.g. phosphorus, arsenic, antimony and bismuth). M' is preferably phosphorus and the preferred bridging groups are the anions of phosphinic acids. Many of these acids are disclosed by Kosolapoff in his book "Organophosphorus Compounds" (John Wiley, 1940). It is evident that for the purpose of forming the polymer backbone by bridging the octahedral metal M atoms, only three valences of the M' atom in each of the bridging groups are used. Thus the remaining valences of the M' atom are satisfied with the two R groups as shown above in the acid formula $R_2M'(O)OH$. These R groups may be the same or different inert organic groups such as alkyl, aryl, alkoxy or aryloxy radicals. Preferably R will be a hydrocarbon alkyl or aryl group containing from one to ten carbon atoms such as, for example, methyl, ethyl, t-butyl, hexyl, octyl, phenyl, tolyl, xylyl, naphthyl and the like. It will also be understood that the two bridging groups need not be the same.

The unidentate ligand $a$, which will have a charge of minus one, will be hydroxyl, and the unidentate liquid $b$ will be water. These unidentate ligands will be bonded to the trivalent octahedral metal and these ligands in combination serve to complete the coordination number of six and to give a polymer which is electrically neutral.

The process for making the polymers used as starting materials for this invention is described in the article by Saraceno and Block in Inorganic Chemistry 3, 1699 (1964), and also in the article appearing in Chemical and Engineering News, Dec. 21, 1964, page 40.

As indicated above, the process of the invention involves the preparation of a non-aqueous solution of the above described polymers and having present in such solution a tertiary amine. The effect of this amine on the polymer is believed to be the replacement of some of the coordinated water molecules in the polymer by the amine. The amount of amine which enters the polymer chain is quite small, being on the order of one part or less of amine per 8 repeating units of the polymer. Since this amount is so small, properties of the polymer are not significantly affected and as pointed out above are actually improved by virtue of the fact that polymers of higher intrinsic viscosity are subsequently obtained.

The non-aqueous solvents which will be used for dissolving the polymer may be selected from a wide variety of organic liquids which have significant solubility for the polymer. Preferably, a halogenated alkane will be used, as for example, chloroform, methylene chloride, trichloroethylene, and the like. Also useful are the chlorinated aromatic solvents such as chlorobenzene, o-dichlorobenzene, trichlorobenzene, and the like.

The tertiary amines which may be used in accord with the invention will include aliphatic tertiary amines and will also include cyclic aliphatic amines and saturated heterocyclic compounds which contain tertiary nitrogen. Preferred classes of tertiary amines are tri-lower-alkyl amines as for example triethylamine, tri-n-butylamine and the like, aliphatic and cycloaliphatic diamines as for example N,N,N',N'-tertamethylethylenediamine, triethylenediamine and N,N'-dimethyldiethylenediamine (N,N'-dimethylpiperazine) and the like, and heterocyclic amines as for example N-methylmorpholine, N-methylpiperidine, etc. The preferred amine for use in the invention will be triethylenediamine.

After the polymer amine complex is prepared in the non-aqueous solution the polymer complex is preferably precipitated from the solution. This may be done by the addition of an organic solvent in which the polymer is normally insoluble and which is miscible with solvent used for the formation of the complex. Examples of such solvents include, a wide variety of liquid, esters, ethers, aliphatic hydrocarbons, ketones, etc. of which examples are ethyl acetate, acetone, diethyl ether, petroleum ether, hexane, and the like. The precipitate is then separated from the liquid phase, preferably by filtration and dried, generally in an oven at 100° C. for a short period of time. The polymer is then re-dissolved in a solvent selected from the group consisting of liquid chlorinated aliphatic and aromatic hydrocarbons which are solvents for the polymer and this solution allowed to stand at room temperature or slightly elevated temperature under which conditions further polymerization occurs.

It is not necessary that the complex be isolated before allowing it to polymerize to the desired polymer. It is possible to remove part of the solvent from the amine-complex solution and take up the remainder with the organic solvent and allow polymerization to occur. However, it is preferred to isolate the complex and it may be subjected to some purification. It then polymerizes to a product of higher intrinsic viscosity and has better properties.

The polymers made by the process of this invention may be formed into superior films not heretofore achieved with polymers of this type. These films are completely homogeneous and have highly improved optical clarity in comparison to films made from similar polymers having lower intrinsic viscosity values.

The following examples will serve to further illustrate the invention:

Example 1

To a solution of 6.0 grams of the polymer having the repeating unit $[Cr(H_2O)(OH)(OP(C_6H_5)_2O)_2]$ in 200 ml. of chloroform at room temperature, was added 0.6 gram of triethylenediamine. The amine dissolved quickly on stirring and then to this solution there was added an equal volume of hexane which caused the polymer to precipitate. The polymer was filtered off and dried in an oven at 100° C. for one hour. The 4.2 grams of polymer thus obtained was dissolved in 140 milliliters of chloroform and allowed to stand at 55 to 65° C. After various periods of standing at this temperature samples of the polymer were taken and the intrinsic viscosity measured. The intrinsic viscosity of the initial polymer was 0.1. After three days it increased to 3.0 and after 10 days the intrinsic viscosity was 5.0. The polymer was very soluble in chloroform and was easily fabricated into a clear, homogeneous, non-mottled film.

When the above experiment was carried out in exactly the same way without the addition of the triethylenediamine, the intrinsic viscosity of the polymer obtained after standing ten days at 65° C. was 2.9. This polymer was insoluble in chloroform and was fabricated into a film, the film was mottled in appearance.

Example 2

The procedure of Example 1 was followed using a different polymer and different tertiary amines were used to form the complex. The data obtained are indicated in the following table:

Example 3

Instead of using chloroform in Example 1 to prepare the amine complex, methylene chloride, trichloroethylene, and o-dichlorobenzene may be used with equivalent results.

Example 4

Following the general procedure of Example 1, the polymer of repeating structure $$[Cr(H_2O)(OH)(OP(CH_3)_2O)_2]$$

is complexed with N-methylpiperidine and subsequently polymerized at a high intrinsic viscosity polymer which is fabricated into a clear film.

It will be understood that numerous changes may be made from the above description and examples without departing from the spirit and scope of the invention.

We claim:

1. A process for increasing the intrinsic viscosity of a polymer having the repeating units

where M is a trivalent octahedral metal selected from the group consisting of chromium, iron, ruthenium, europium and ytterbium, $a$ is hydroxyl, $b$ is a water molecule, X is a bridging group having the structure $R_2M'(O)OH$ where R is selected from the group consisting of alkyl, aryl, alkoxy and aryloxy, and M' is an element of group VB having an atomic number greater than 7, which comprises forming a complex of said polymer with a tertiary amine, dissolving the complex in a solvent selected from the group consisting of liquid chlorinated aromatic hydrocarbon and liquid chlorinated aliphatic hydrocarbons and allowing said solution to stand, whereby further polymerization occurs and the intrinsic viscosity of the polymer is increased.

2. A process as in claim 1 where M is chromium and X is a substituted phosphinic acid.

3. A process for increasing the intrinsic viscosity of a polymer having the repeating unit $$[Cr(H_2O)(OH)(OP(C_6H_5)_2O)_2]$$

which comprises forming a complex of said polymer with triethylenediamine, dissolving said complex in a liquid halogenated alkane and allowing said solution to stand whereby an increased intrinsic viscosity of the polymer is obtained.

4. The process of claim 3 where the liquid halogenated alkane is chloroform.

5. A process for increasing the intrinsic viscosity of a polymer having the repeating unit $$[CR(H_2O)(OH)(OP(CH_3)(C_6H_5)O)_2]$$

which comprises forming a complex of said polymer with a tertiary amine, dissolving said complex in a liquid halogenated alkane and allowing said solution to stand whereby an increased intrinsic viscosity of the polymer is obtained.

TABLE I

| Polymer | Tertiary amine | Intrinsic Viscosity after— | |
|---|---|---|---|
| | | 10 days | 19 days |
| $[Cr(H_2O)(OH)(OP(CH_3)(C_6H_5)O)_2]_x$ | None | 0.6 | 0.6 |
| | Triethylenediamine | 1.4 | 1.7 |
| | N-methylmorpholine | 1.1 | |
| | Triethylamine | 1.0 | |

6. The process of claim 5 where the tertiary amine is triethylenediamine and the liquid alkane is chloroform.

7. The process of claim 5 where the tertiary amine is N-methylmorpholine and the liquid alkane is chloroform.

8. The process of claim 5 where the tertiary amine is triethylamine and the liquid alkane is chloroform.

References Cited

UNITED STATES PATENTS

| | | | |
|---|---|---|---|
| 3,197,436 | 7/1965 | Block et al. | 260—2 |
| 3,275,574 | 9/1966 | Saraceno | 260—2 |

SAMUEL H. BLECH, *Primary Examiner.*